(12) United States Patent  
Kim

(10) Patent No.: US 10,090,754 B2  
(45) Date of Patent: Oct. 2, 2018

(54) PHOTOVOLTAIC INVERTER

(71) Applicant: LSIS CO., LTD., Gyeonggi-do (KR)

(72) Inventor: Young-Min Kim, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/599,640

(22) Filed: May 19, 2017

(65) Prior Publication Data

US 2018/0062502 A1  Mar. 1, 2018

(30) Foreign Application Priority Data

Aug. 29, 2016  (KR) .................. 10-2016-0109839

(51) Int. Cl.
*H02M 1/14* (2006.01)
*H02J 1/02* (2006.01)
(Continued)

(52) U.S. Cl.
CPC .............. *H02M 1/14* (2013.01); *H02J 1/02* (2013.01); *H02M 7/4826* (2013.01);
(Continued)

(58) Field of Classification Search
CPC .............. H02M 1/14; H02M 7/4826; H02M 2001/0006; H02J 1/02; H02J 3/383;
(Continued)

(56) References Cited

U.S. PATENT DOCUMENTS 8,194,375 B2 *  6/2012  Said El-Barbari ..........................
H01L 31/02021
361/91.1
9,331,564 B2 *  5/2016  Lehmann ................ H02M 1/36
(Continued)

FOREIGN PATENT DOCUMENTS

CN          102544212 A      7/2012
CN          204068851 U     12/2014
(Continued)

OTHER PUBLICATIONS

Received STIC search report from EIC 2800 searcher Benjamin Martin on Aug. 16, 2017.*

(Continued)

*Primary Examiner* — Timothy J Dole
*Assistant Examiner* — Htet Z Kyaw
(74) *Attorney, Agent, or Firm* — K&L Gates LLP

(57) ABSTRACT

Disclosed herein is a photovoltaic inverter that prevents degradation in the efficiency of photovoltaic generation by applying a reverse voltage of a DC voltage stored in a DC link capacitor to a solar cell array. The photovoltaic inverter includes: a DC link capacitor configured to store a DC voltage output from the solar cell array; a power conversion stage configured to generate an AC power by using the DC voltage stored in the DC link capacitor to transmit the generated AC power to a power system; and a controller configured to apply the DC voltage stored in the DC link capacitor to the power conversion stage or apply a reverse (Continued)

voltage of the DC voltage stored in the DC link capacitor to the solar cell array depending on whether a driving value of the solar cell array satisfies a predetermined driving condition.

9 Claims, 8 Drawing Sheets

(51) Int. Cl.
*H02M 7/48* (2007.01)
*H02S 40/30* (2014.01)
*H02M 1/00* (2006.01)

(52) U.S. Cl.
CPC ..... *H02S 40/30* (2014.12); *H02M 2001/0006* (2013.01); *Y02E 10/16* (2013.01); *Y10T 307/32* (2015.04); *Y10T 307/707* (2015.04)

(58) Field of Classification Search
CPC .... H02J 3/385; H02J 3/381; H02J 3/32; H02J 3/16; H02J 3/50; Y10T 307/32; Y10T 307/707; Y02E 10/16
USPC .......... 363/71, 132, 95, 40; 290/16; 318/100.29; 375/238
See application file for complete search history.

(56) References Cited

U.S. PATENT DOCUMENTS

| | | | | |
|---|---|---|---|---|
| 9,343,906 | B2* | 5/2016 | Kaiser | H02J 3/383 |
| 9,484,734 | B2* | 11/2016 | Falk | H01L 31/02021 |
| 10,027,249 | B2* | 7/2018 | Falk | H01L 31/02021 |
| 2005/0231172 | A1* | 10/2005 | Kato | B60L 11/1803 320/166 |
| 2009/0167097 | A1* | 7/2009 | Seymour | H02J 3/383 307/113 |
| 2011/0210612 | A1* | 9/2011 | Leutwein | H02J 3/383 307/80 |
| 2012/0026769 | A1* | 2/2012 | Schroeder | H02J 3/383 363/131 |
| 2012/0228951 | A1* | 9/2012 | Lehmann | H02M 1/36 307/85 |
| 2012/0262949 | A1* | 10/2012 | Han | H02J 3/385 363/16 |
| 2012/0280567 | A1 | 11/2012 | Buller et al. | |
| 2013/0234518 | A1* | 9/2013 | Mumtaz | H02J 3/40 307/46 |
| 2014/0177298 | A1* | 6/2014 | Reymond | H02M 1/32 363/56.03 |
| 2014/0347770 | A1* | 11/2014 | Falk | H01L 31/02021 361/42 |
| 2015/0069859 | A1* | 3/2015 | Yun | H02H 11/002 307/151 |
| 2016/0344192 | A1* | 11/2016 | Eizips | H02J 3/385 |

FOREIGN PATENT DOCUMENTS

| | | |
|---|---|---|
| CN | 104333319 A | 2/2015 |
| CN | 105720907 A | 6/2016 |
| JP | 2002026356 A | 1/2002 |
| JP | 2010225776 A | 10/2010 |
| JP | 2010-541251 A | 12/2010 |
| JP | 2014099438 A | 5/2014 |
| KR | 10-2014-0111159 A | 9/2014 |
| KR | 10-2016-0005613 A | 1/2016 |
| WO | 2009042795 A1 | 4/2009 |

OTHER PUBLICATIONS

Received STIC search report from EIC 2800 searcher Samir Patel on Jul. 30, 2018.*
European Search Report for related European Application No. 17171334.0; report dated Oct. 30, 2017; (7 pages).
Japanese Office Action for related Japanese Application No. 2017-099152; action dated Oct. 24, 2017; (3 pages).
R. Swanson, et al; "The Surface Polarization Effect in High-Efficiency Silicon Solar Cells"; Technical Digest; vol. 1; Oct. 2005; (3 pages).
S. Pingel, et al; "Potential Induced Degradation of Solar Cells and Panels"; article; Copyright 2010; IEEE; (6 pages).

* cited by examiner

PHOTOVOLTAIC INVERTER

CROSS-REFERENCE TO RELATED APPLICATIONS

This application claims the benefit of Korean Patent Application No. 10-2016-0109839, filed on Aug. 29, 2016, entitled "PHOTOVOLTAIC INVERTER", which is hereby incorporated by reference in its entirety into this application.

BACKGROUND

1. Technical Field

The present disclosure relates to a photovoltaic inverter, and more specifically to a photovoltaic inverter that prevents degradation in the efficiency of photovoltaic generation by applying a reverse voltage of a DC voltage stored in a DC link capacitor to a solar cell array.

2. Description of the Related Art

The use of fossil fuels as major energy sources is becoming more and more restricted due to adverse effects such as climate change. Recently, renewable energy is attracting attention as coal and oil are depleted. Accordingly, a renewable energy generation system is becoming important as it is capable of producing environmentally friendly electric power and supplying the produced electric power stably and efficiently.

Among these, a photovoltaic system prevails since it has advantage that it has less limitations in installing and the size can be freely determined, which meet the requirements in the current situation where energy sources tend to be diversified and decentralized. The photovoltaic system essentially includes a solar cell array and a photovoltaic solar inverter. The photovoltaic inverter serves to convert DC power generated in the solar cell array into AC power.

Typically, a solar cell array is installed in a metal frame connected to the ground potential. The output terminal of the solar cell array is not connected to the ground potential for stability reasons. Accordingly, a potential difference is created between the metal frame and the solar cell array. If such a potential difference lasts, polarization occurs, i.e., some electrons generated in the solar cell array flow out through the metal frame. Such polarization degrades the efficiency of power generation, which is referred to as potential induced degradation (PID).

As a known method for improving such PID, it has previously been proposed to apply a reverse voltage to the solar cell array. Hereinafter, an existing photovoltaic system for improving the ND will be described in detail with reference to FIG. 1.

FIG. 1 is a diagram for illustrating a scheme for applying a reverse voltage to a solar cell array using an additional offset box in an existing photovoltaic system. Referring to FIG. 1, the existing photovoltaic system includes a solar cell array 13, a photovoltaic inverter 10, and a power system 14.

The photovoltaic inverter 10 includes a DC link capacitor 11 and a power conversion stage 12. The DC link capacitor 11 stores a DC voltage output from the photovoltaic array 13. Further, the power conversion stage 12 converts the DC voltage stored in the DC link capacitor 11 into an AC power and supplies the AC power to the power system 14.

According to the existing scheme for reducing the PID, after the photovoltaic generation is stopped, the separate offset box 40 is used to apply a reverse voltage that is opposite in polarity to the voltage applied to the solar cell array 13 during photovoltaic generation.

More specifically, when the photovoltaic generation is stopped, the connection between the power conversion stage 12 and the power system 14 and the connection between the solar cell array 13 and the DC link capacitor 11 are cut off, and the high voltage stored in the DC link capacitor 11 is discharged through a rapid discharge circuit.

The output terminals of the solar cell array 13 are connected to the terminals of the offset box 20 having the opposite polarities, respectively. The offset box 20 applies a reverse voltage to the solar cell array 13 to reduce the polarization.

However, according to the existing scheme, there is a problem that it requires the additional offset box separately installed in addition to the photovoltaic inverter for reducing the PID, incurring unnecessary cost.

Further, according to the existing scheme, a power supplied from an external source outside the photovoltaic system is used for reducing the PID, such that residual energy stored in the DC link capacitor cannot be efficiently utilized.

SUMMARY

It is an object of the present disclosure to provide a photovoltaic inverter capable of preventing degradation in the efficiency of photovoltaic generation by applying a reverse voltage of a DC voltage stored in a DC link capacitor to a solar cell array.

It is another object of the present disclosure to provide a photovoltaic inverter capable of improving the efficiency of photovoltaic generation by determining whether to apply the DC voltage stored in a DC link capacitor or the reverse voltage thereof based on the magnitude, the driving time, the intensity of polarization of the output voltage of a solar cell array, for example.

It is another object of the present disclosure to provide a photovoltaic inverter capable of saving cost for establishing the photovoltaic system by controlling switches connecting a solar cell array to a DC link capacitor to apply a reverse voltage to the solar cell array with no separate module for applying the reverse voltage.

It another object of the present disclosure to provide a photovoltaic inverter capable of efficiently utilizing the residual energy of photovoltaic generation by using open-circuit voltage output from the solar cell array to reduce the polarization of the solar cell array, instead of discharging the open-circuit voltage.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a photovoltaic inverter includes: a DC link capacitor configured to store a DC voltage output from the solar cell array; a power conversion stage configured to generate an AC power by using the DC voltage stored in the DC link capacitor to transmit the generated AC power to a power system; and a controller configured to apply the DC voltage stored in the DC link capacitor to the power conversion stage or apply a reverse voltage of the DC voltage stored in the DC link capacitor to the solar cell array depending on whether a driving value of the solar cell array satisfies a predetermined driving condition.

According to an exemplary embodiment of the present disclosure, degradation in the efficiency of photovoltaic generation can be prevented by applying a reverse voltage of a DC voltage stored in a DC link capacitor to a solar cell array.

According to another exemplary embodiment of the present disclosure, the efficiency of photovoltaic generation can be improved by determining whether to apply the DC voltage stored in a DC link capacitor or the reverse voltage thereof based on the magnitude, the driving time, the intensity of polarization of the output voltage of a solar cell array, for example.

According to an exemplary embodiment of the present disclosure, a reverse voltage can be applied to the solar cell array by controlling the switches connecting the solar cell array to the DC link capacitor with no separate module for applying a reverse voltage, thereby saving cost for configuring the photovoltaic system.

Further, according to an exemplary embodiment of the present disclosure, the open-circuit voltage output from the solar cell array is not discharged but is used for reducing the polarization of the solar cell array, such that the residual energy of the photovoltaic power generation can be efficiently utilized.

DETAILED DESCRIPTION

Figure 1:
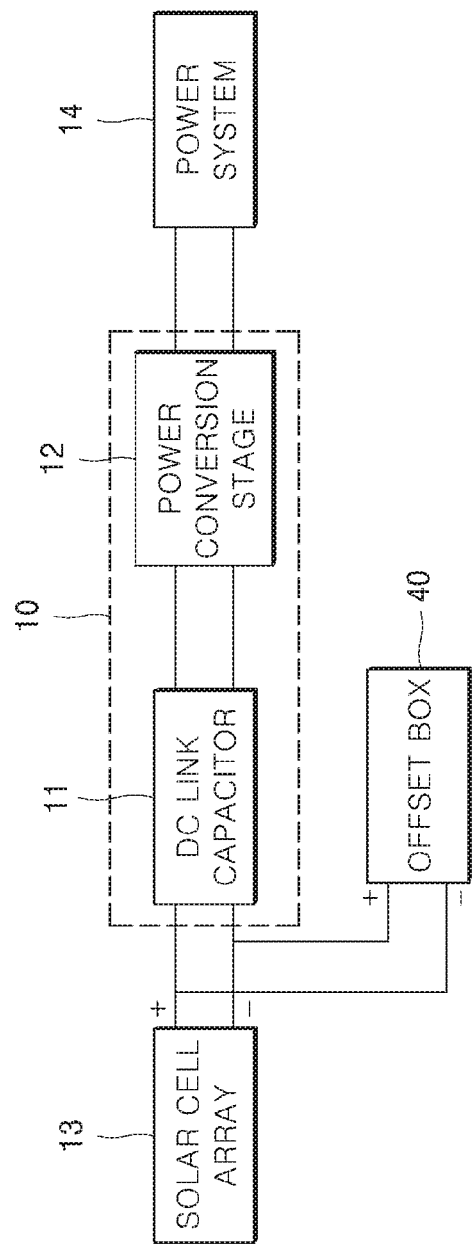
FIG. 1 is a diagram for illustrating a scheme for applying a reverse voltage to a solar cell array using an additional offset box in an existing photovoltaic system.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 2:
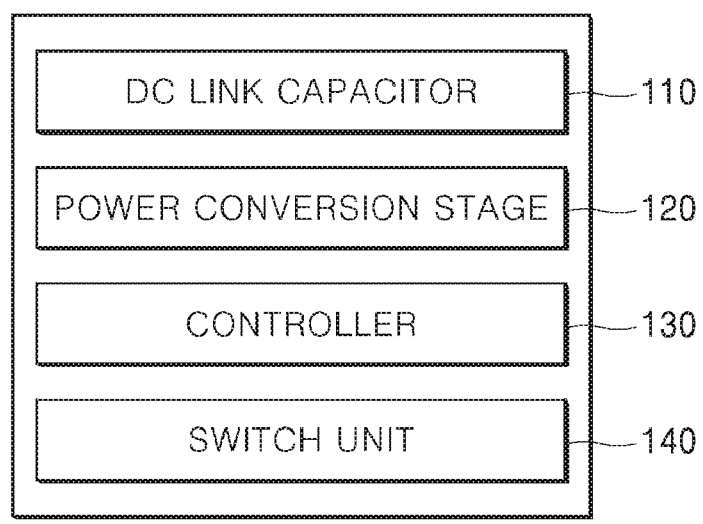
FIG. 2 is a diagram for illustrating a photovoltaic inverter according to an exemplary embodiment of the present disclosure.

FIG. 2 is a diagram for illustrating a photovoltaic inverter 100 according to an exemplary embodiment of the present disclosure. Referring to FIG. 2, the photovoltaic inverter 100 according to an exemplary embodiment of the present disclosure includes a DC link capacitor 110, a power conversion stage 120, a controller 130, and a switch unit 140. The photovoltaic breaker 100 shown in FIG. 2 is merely an exemplary embodiment of the present disclosure, and the elements are not limited to those shown in FIG. 2. Some elements may be added, modified or eliminated as desired.

Figure 3:
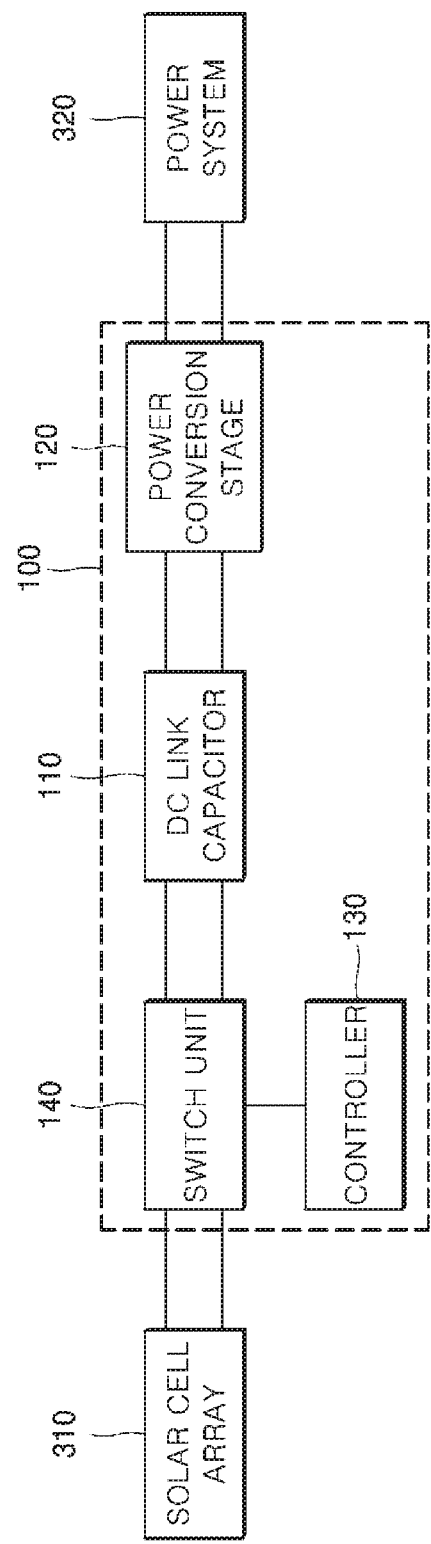
FIG. 3 is a diagram for illustrating the photovoltaic inverter according to the exemplary embodiment of the present disclosure connected to a solar cell array and a power system.

FIG. 3 is a diagram for illustrating the photovoltaic inverter 100 according to the exemplary embodiment of the present disclosure connected to a solar cell array 310 and a power system 320. Hereinafter, the photovoltaic inverter 100 and its elements, i.e., the DC link capacitor 110, the power conversion stage 120, the controller 130, and the switch unit 140 will be described in detail with reference to FIGS. 2 and 3.

Referring to FIG. 3, the DC link capacitor 110 according to an exemplary embodiment of the present disclosure may store a DC voltage output from the solar cell array 310. More specifically, the DC link capacitor 110 may store the DC voltage output from the solar cell array 310 and transmitted through the switch unit 140. The switch unit 140 may form a transmission path through which the DC voltage output from the solar cell array 310 is transmitted, which will be described later.

The solar cell array 310 may include one or more solar cell panels connected in series or in parallel that produce electric energy using solar energy. The solar cell array 310 may convert the light energy of incident sunlight into DC voltage and output it.

The DC link capacitor 110 may store the DC voltage output from the solar cell array 310 having a voltage level equal to or greater than a predetermined level in order to supply the voltage to the power conversion stage 120, which will be described later. To this end, a DC/DC converter which is a step-up circuit, a switching regulator or the like may be disposed between the DC link capacitor 110 and the solar cell array 310. The DC link capacitor 110 may store a DC voltage of a predetermined level or more by smoothing the output voltage from the DC/DC converter, the switching regulator, and the like.

Referring back to FIG. 3, the power conversion stage 120 may generate AC power using the DC voltage stored in the DC link capacitor 110, and may transmit the generated AC power to the power system 320. More specifically, the power conversion stage 120 may convert the DC voltage stored in the DC link capacitor 110 into an alternating current by PWM (Pulse Width Modulation) control.

The power conversion stage 120 may further include a DC/DC converter for stepping up a DC voltage stored in the DC link capacitor 110, and the like. The power conversion stage 120 may convert the DC voltage stepped up by PWM (Pulse Width Modulation) control into alternating current.

The power system 320 may include a system in which generation and use of electric power is performed. For example, the power system 320 may include any system that consumes power from a typical home to a large industrial facility.

The controller 130 according to an exemplary embodiment of the present disclosure may determine whether the driving value of the solar cell array 310 satisfies a predetermined driving condition. The controller 130 may apply the DC voltage stored in the DC link capacitor 110 to the power conversion stage 120 based on the determination result. In addition, the controller 130 may apply the reverse voltage of the DC voltage stored in the DC link capacitor 110 to the solar cell array 310 based on the determination result.

The driving value of the solar cell array 310 may include at least one of the magnitude of the DC voltage output from the solar cell array 310, the driving time of the solar cell array 310, the driving time period of the solar cell array 310, and the intensity of polarization of the solar cell array 310.

As used herein, the driving time refers to the time at which the solar cell array 310 is currently driven, and the driving time period refers to a continuous time that elapsed since the solar cell array 310 has started being driven until the present time.

For example, when the current time is 2:30 pm, for the solar cell array 310 driven since 10:00 am, the driving time is 2:30 pm, and the driving time period is 4 hours and 30 minutes. The intensity of polarization [$C/m^2$] is a numerical value representing the amount of the polarized electric charge per unit area or the density of electric dipole moments induced per unit area.

The driving condition is to drive the solar cell array 310, and may be set according to the driving value of the solar cell array 310. More specifically, if the driving value of the solar cell array 310 is the magnitude of the DC voltage output from the solar cell array 310, the driving condition may be a range of voltages for driving the solar cell array 310.

For example, the magnitude of the DC voltage output from the solar cell array 310 may be 600 V, and the driving condition, i.e., the range of the driving voltage may be 400 V or higher. In this example, the magnitude of the DC voltage is greater than 400 V, and thus the driving value of the solar cell array 310 can satisfy the driving condition.

If the driving value of the solar cell array 310 is the driving time of the solar cell array 310, the driving condition can be satisfied when the driving time of the solar cell array 310 lies within a predetermined driving start time and a predetermined driving end time.

For example, the driving time of the solar cell array 310 is 5:30 pm, and the driving start time and the driving end time of the solar cell array 310, which are the driving condition, may be 10:00 am and 6:00 pm, respectively. In this example, since the time 5:00 pm is between 10:00 am and 6:00 pm, the driving value of the solar cell array 310 can satisfy the driving condition of the solar cell array 310.

When the driving value of the solar cell array 310 is the driving time period of the solar cell array 310, the driving condition can be satisfied when the driving time period of the solar cell array 310 lies within a predetermined maximum driving time period.

For example, the driving time period of the solar cell array 310 is 12 hours, and the maximum driving time of the solar cell array 310, which is the driving condition, may be 10 hours. In this example, the driving time period is greater than 10 hours, the driving value of the solar cell array 310 may not satisfy the driving condition.

If the driving value of the solar cell array 310 is the intensity of the polarization of the solar cell array 310, the predetermined driving condition can be satisfied if the intensity of polarization of the solar cell array 310 lies within the range of the intensity of polarization for driving the solar cell array 310.

For example, the range of the intensity of polarization for driving the solar cell array 310 may be set to be less than a particular intensity of polarization. The range of the intensity of polarization may vary depending on the performance of the solar cell and the user's setting.

In addition, according to an exemplary embodiment of the present disclosure, the photovoltaic inverter may further include a voltage sensor, a timer, a device for measuring intensity of polarization, etc., for measuring the driving value of the solar cell array 310 described above.

As described above, if the driving voltage of the solar cell array 310 satisfies predetermined driving conditions, the controller 130 may apply the DC voltage stored in the DC link capacitor 110 to the power conversion stage 120. On the other hand, if the driving value of the solar cell array 310 does not satisfy the predetermined driving conditions, the controller 130 may apply a reverse voltage of the DC voltage stored in the DC link capacitor 110 to the solar cell array 310.

As used herein, the reverse voltage refers to a voltage having the same magnitude as and the opposite polarity to the DC voltage stored in the DC link capacitor 110. For example, if the DC voltage stored in the DC link capacitor 110 is +500 V, the reverse voltage is −500 V.

In this manner, when the reverse voltage of the DC voltage stored in the DC link capacitor 110 is applied to the solar cell array 310, the polarization of the solar cell, which is increased during the solar power generation, can be reduced. As a result, it is possible to prevent degradation in the efficiency of photovoltaic generation.

According to an exemplary embodiment of the present disclosure, it is determined whether to apply the DC voltage stored in the DC link capacitor 110 or the reverse voltage thereof based on various driving values of the solar cell array 310, and thus the polarization of the solar cell described above can be reduced, and the efficiency of photovoltaic generation can be also improved.

Referring to FIG. 3, the controller 130 controls the switch unit 140 so that the DC voltage stored in the DC link capacitor 110 is applied to the power conversion stage 120 or the reverse voltage of the DC voltage stored in the DC link capacitor 110 is applied to the solar cell array 310. Hereinafter, the switch unit 140 controlled by the controller 130 will be described in detail with reference to FIGS. 4 to 7.

Figure 4:
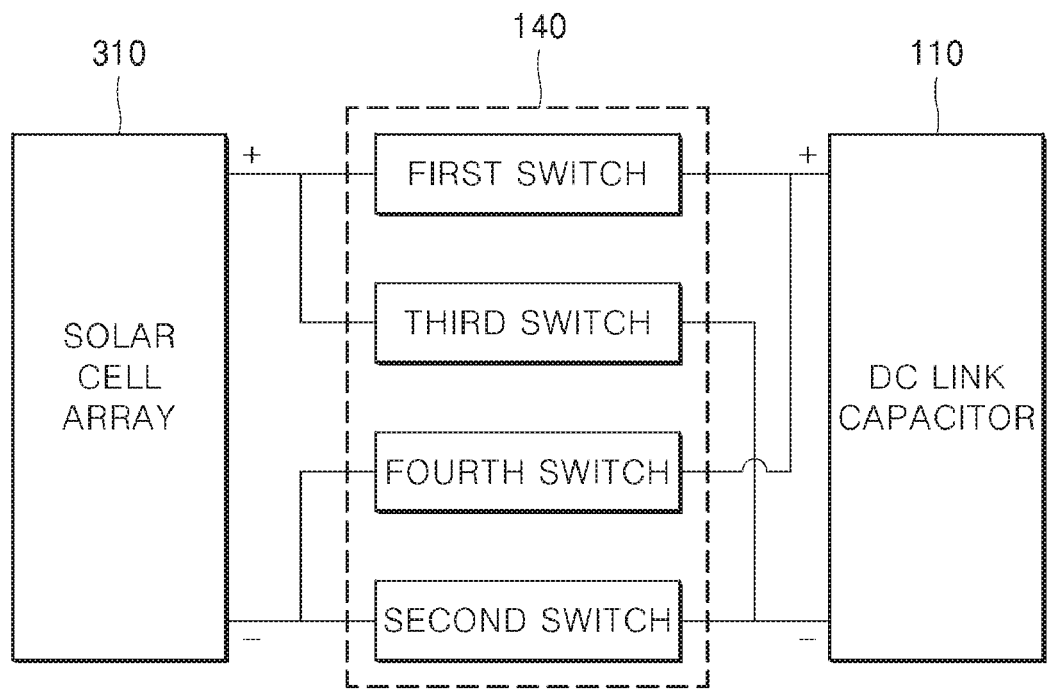
FIG. 4 is a diagram for illustrating the switch unit connected between the solar cell array and the DC link capacitor according to an exemplary embodiment of the present disclosure.

FIG. 4 is a diagram for illustrating the switch unit connected between the solar cell array and the DC link capacitor according to an exemplary embodiment of the present disclosure. Referring to FIG. 4, the switch unit 140 according to the exemplary embodiment of the present disclosure connects the positive terminal and the negative terminal of the solar cell array 310 to the positive terminal and the negative terminal or to the negative terminal and the positive terminal of the DC link capacitor 110, thereby forming a transmission path.

More specifically, the switch unit 140 includes a first switch connected between the positive terminal (+) of the solar cell array 310 and the positive terminal (+) of the DC link capacitor 110, a second switch connected between the negative terminal (−) of the solar cell array 310 and the negative terminal (−) of the DC link capacitor 110, a third switch connected between the positive terminal (+) of the solar cell array 310 and the negative terminal (−) of the DC link capacitor 110, and a fourth switch connected between the negative terminal (−) of the solar cell array 310 and the positive terminal (+) of the DC link capacitor 110.

The first to fourth switches may be turned on or off by a control signal from the controller 130. They may be implemented using switching elements such as a gate turn-off thyristor (GTO), a bipolar junction transistor (BJT), a metal oxide silicon field effect transistor (MOSFET) and an IGBT (insulated gate bipolar mode transistor).

Figure 5:
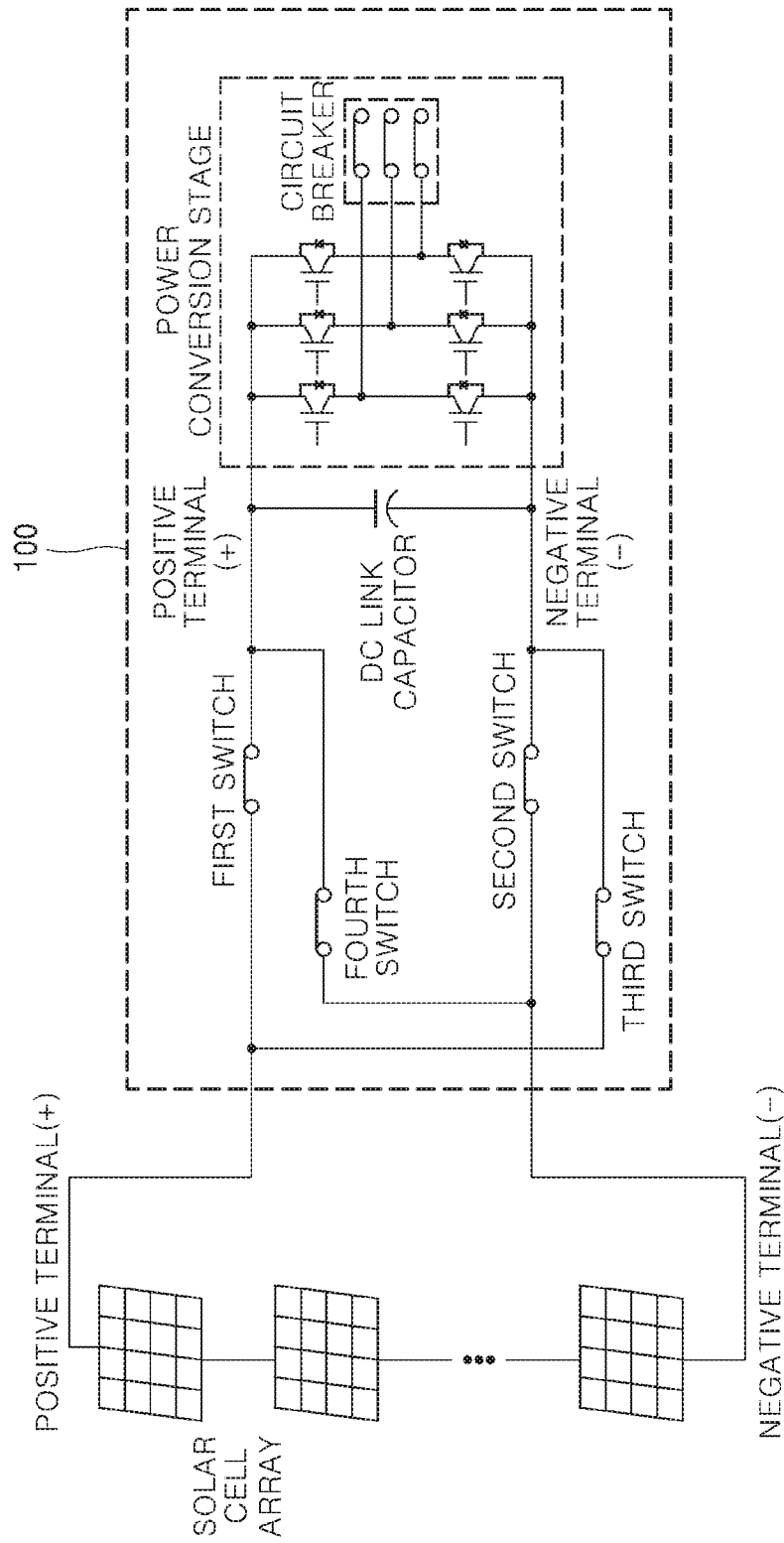
FIG. 5 is a diagram for illustrating a photovoltaic inverter connected to a solar cell array according to an exemplary embodiment of the present disclosure.

FIG. 5 is a diagram illustrating a circuit in which the photovoltaic inverter 100 is connected to the solar cell array 310 according to an exemplary embodiment of the present disclosure. Referring to FIG. 5, the photovoltaic inverter 100 may be configured such that the switch unit 140 including the first to fourth switches, the DC link capacitor 110 and the power conversion stage 120 share the positive terminal and the negative terminal.

The positive terminal of the photovoltaic inverter 100 may be connected to the positive terminal and the negative terminal of the solar cell array 310 via the first switch and the fourth switch, respectively. In addition, the negative terminal of the photovoltaic inverter 100 may be connected to the negative terminal and the positive terminal of the solar cell array 310 via the second switch and the third switch, respectively.

Although not shown in the drawings, the controller 130 may control the first to fourth switches to form a transmission path between the solar cell array 310 and the DC link capacitor 110.

The power conversion stage 120 may convert a DC voltage stored in the DC link capacitor 110 into alternating current by switching control such as PWM control to generate AC power. To this end, the power conversion stage 120 may include a plurality of switching elements. The power conversion stage 120 may further include a breaker connected to the power system 320 to transmit the generated AC power to the power system 320.

Figure 6:
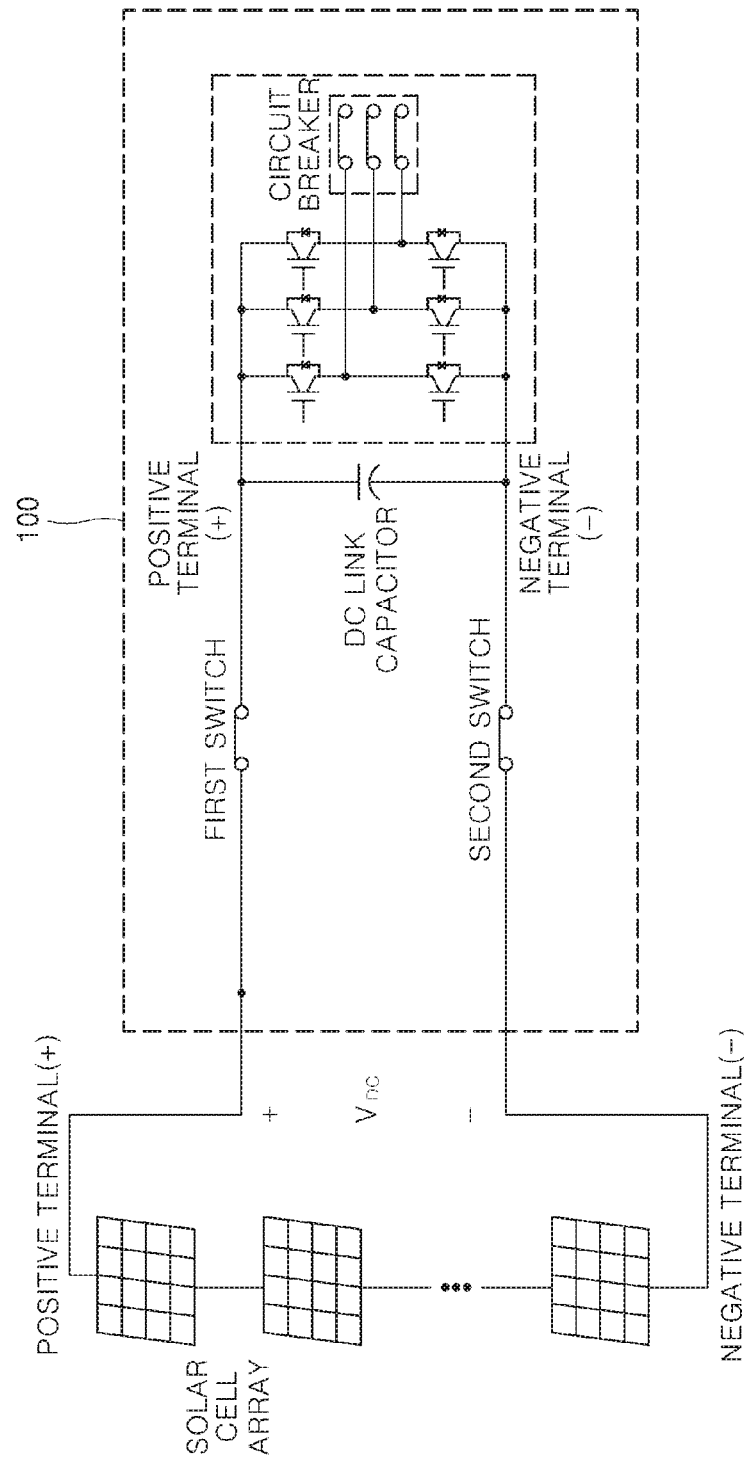
FIG. 6 is a diagram for illustrating a circuit configured to apply a DC voltage stored in the DC link capacitor to the power conversion stage.

FIG. 6 is a diagram for illustrating a circuit in a mode to apply a DC voltage stored in the DC link capacitor 110 to the power conversion stage 120. Referring to FIG. 6, if the driving value of the solar cell array 310 satisfies a predetermined driving condition, the controller 130 turns on the first switch and the second switch and turns off the third switch and the fourth switch.

More specifically, if the condition for driving the solar cell array 310 is satisfied, the controller 130 turns on the first and second switches and turns off the third and fourth switches, to form a transmission path. In other words, if the condition for driving the solar cell array 310 is satisfied, the positive terminal and the negative terminal of the solar cell array 310 may be connected to the positive terminal and the negative terminal of the DC link capacitor 110, respectively.

Accordingly, the DC link capacitor 110 can store the DC voltage $V_{DC}$ output from the solar cell array 310. The power conversion stage 120 may convert the DC voltage $V_{DC}$ stored in the DC link capacitor 110 into AC power by the switching control and transmit the AC power to the power system 320 via the circuit breaker.

Figure 7:
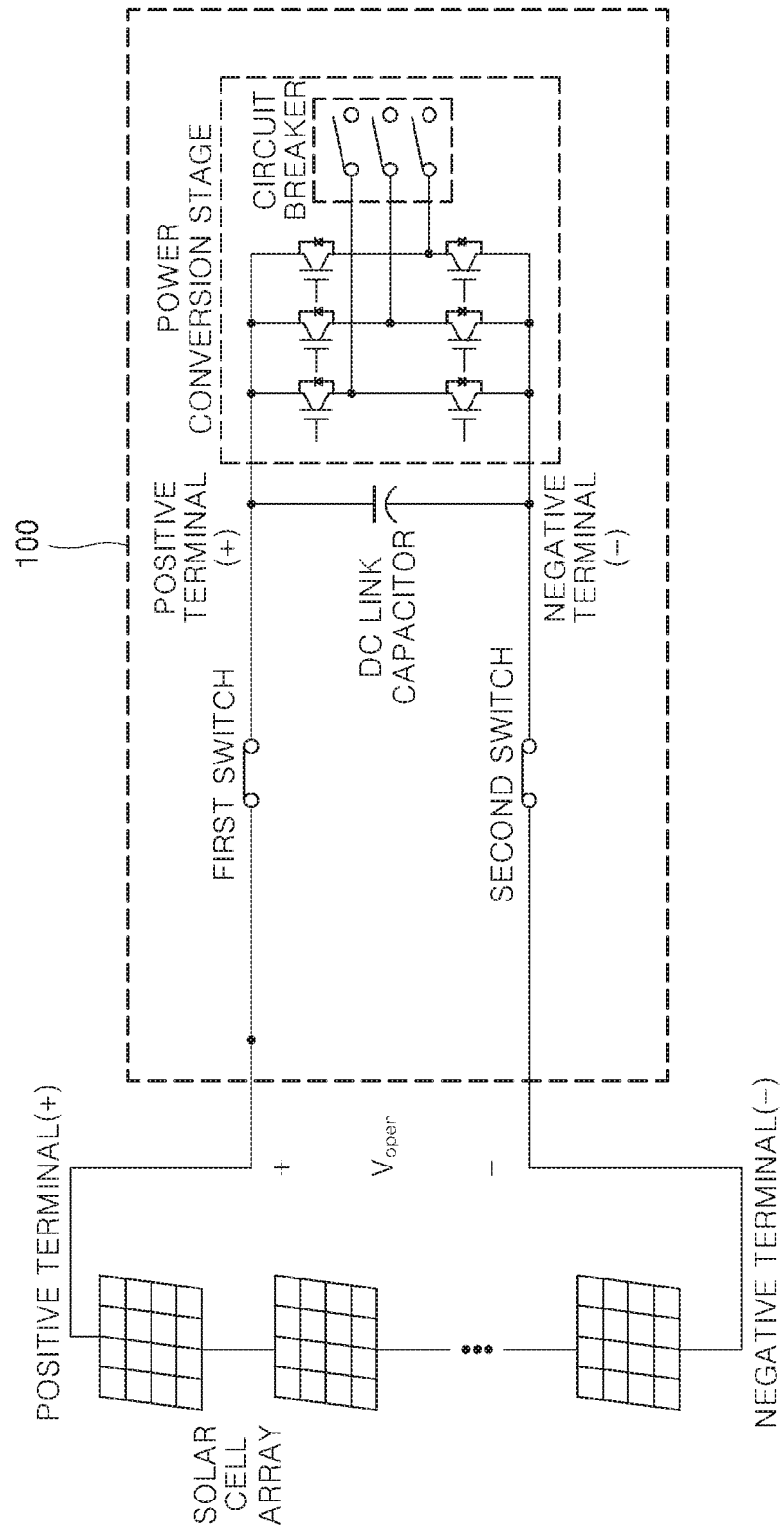
FIG. 7 is a diagram for illustrating a circuit configured to store an open-circuit voltage output from the solar cell array by the DC link capacitor.
Figure 8:
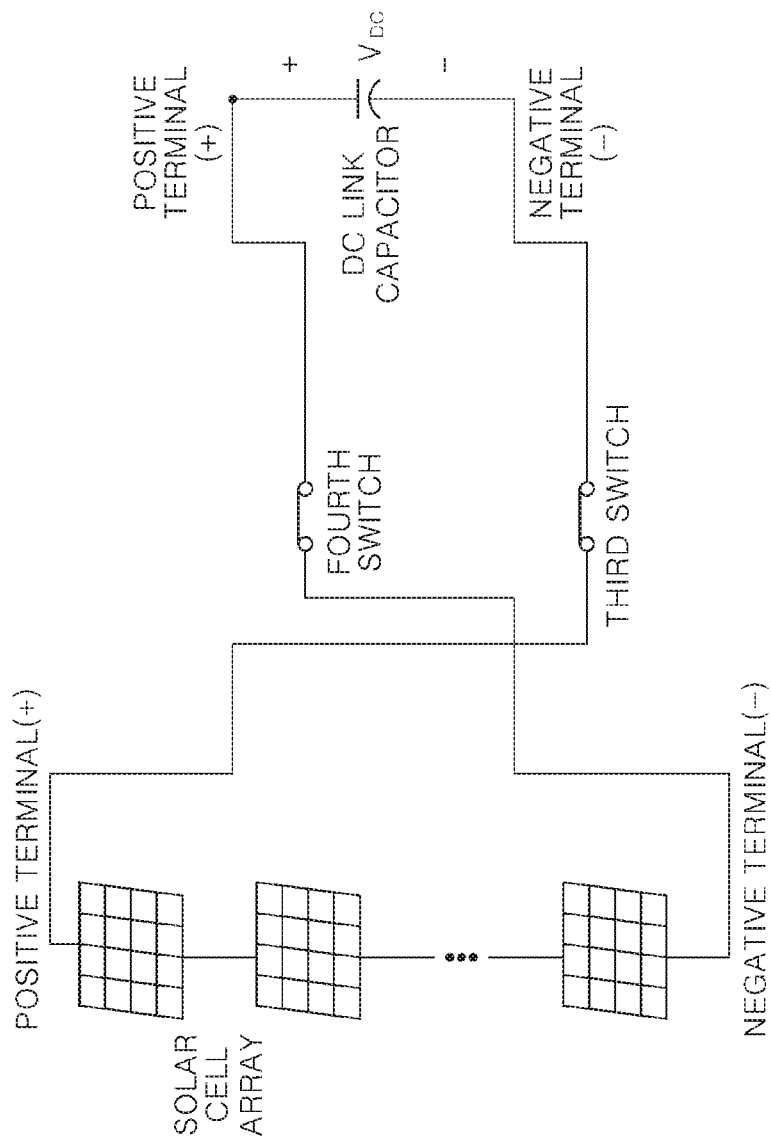
FIG. 8 is a diagram for illustrating a circuit configured to apply a reverse voltage of the DC voltage stored in the DC link capacitor to the solar cell array.

FIG. 7 is a diagram illustrating a circuit configured to store an open-circuit voltage ($V_{open}$) output from the solar cell array 310 by the DC link capacitor 110 according to an exemplary embodiment of the present disclosure. FIG. 8 is a diagram for illustrating a circuit configured to apply a reverse voltage of the DC voltage stored in the DC link capacitor 110 to the solar cell array 310.

Referring to FIG. 7, if the driving value of the solar cell array 310 does not satisfy the predetermined driving condition, the power conversion stage 120 may interrupt the AC power transmitted to the power system 320. More specifically, if the condition for driving the solar cell array 310 is not satisfied, the power conversion stage 120 may open the circuit breaker to interrupt the connection between the photovoltaic inverter 100 and the power system 320.

Referring again to FIG. 7, if the driving value of the solar cell array 310 does not satisfy the predetermined drive condition, the DC link capacitor 110 may store the open-circuit voltage $V_{open}$ output from the solar cell array 310.

More specifically, as described above, when the power conversion stage 120 turns off the breaker to interrupt the connection between the photovoltaic inverter 100 and the power system 320, the internal circuit of the photovoltaic inverter 100 may be an open circuit. The output voltage of the solar cell array 310 may be the open-circuit voltage $V_{open}$, and the DC link capacitor 110 may store the open-circuit voltage $V_{open}$ output from the solar cell array 310.

Referring to FIG. 8, if the driving value of the solar cell array 310 does not satisfy the predetermined driving condition, the controller 130 may turn off the first switch and the second switch and turn on the third switch and the fourth switch. In other words, if the condition for driving the solar cell array 310 is not satisfied, the positive terminal and the negative terminal of the solar cell array 310 may be connected to the negative terminal and the positive terminal of the DC link capacitor 110, respectively.

The voltage dropped from the positive terminal of the solar cell array 310 to the negative terminal of the solar cell array 310 may be $-V_{DC}$, which is the reverse voltage of the DC voltage $V_{DC}$ stored in the DC link capacitor 110. Therefore, when the reverse voltage is applied, the positive terminal of the solar cell array 310 may have a potential lower than that of the negative terminal of the solar cell array 310.

On the other hand, if the driving value of the solar cell array 310 does not satisfy the predetermined driving condition, the internal circuit of the photovoltaic inverter 100 may be an open circuit, as described above. The DC voltage $V_{DC}$ stored in the DC link may be equal to the open-circuit voltage $V_{open}$, and the voltage dropped from the positive terminal of the solar cell array 310 to the negative terminal of the photovoltaic cell array 310 may be $-V_{open}$.

As described above, in order to apply the reverse voltage of the open-circuit voltage $V_{open}$ to the solar cell array 310, it may be desirable to open the circuit breaker by the power conversion stage 120 before the controller 130 controls the switch unit 140.

More specifically, when the power conversion stage 120 opens the breaker, the open-circuit voltage $V_{open}$ is stored in the DC link capacitor 110. Then, when the controller 130 controls the switch unit 140 to form the transmission path as shown in FIG. 8, the reverse voltage of the open-circuit voltage $V_{open}$ may be applied to the solar cell array 310.

As described above, according to an exemplary embodiment of the present disclosure, a reverse voltage can be applied to the solar cell array by controlling the switches connecting the solar cell array to the DC link capacitor with no separate module for applying the reverse voltage, thereby saving cost for establishing the photovoltaic system.

Further, according to an exemplary embodiment of the present disclosure, the open-circuit voltage output from the solar cell array is not discharged but is used for reducing the polarization of the solar cell array, such that the residual energy of the photovoltaic power generation can be efficiently utilized.

According to an exemplary embodiment of the present disclosure, the controller 130 may control the DC voltage $V_{DC}$ so that the DC voltage $V_{DC}$ output from the solar cell array 310 tracks the maximum power of the solar cell array 310.

The DC voltage $V_{DC}$ and the current output from the solar cell array 310 have nonlinear characteristics due to factors such as the material of the solar cell array 310. More specifically, the current output from the solar cell array 310 gradually decreases and then decreases sharply in a particular period, as the DC voltage $V_{DC}$ increases.

Accordingly, the generated power of the solar cell array 310 with respect to the direct-current voltage $V_{DC}$ increases as the DC voltage $V_{DC}$ increases, and decreases sharply when the DC current voltage $V_{DC}$ exceeds a certain voltage. In other words, when the DC voltage $V_{DC}$ is a certain voltage, the amount of generated power of the solar cell array 310 can be the maximum value.

According to an exemplary embodiment of the present disclosure, the controller 130 may control the magnitude of the voltage $V_{DC}$ output from the solar cell array 310 so that it tracks the maximum power of the solar cell array 310 based on the electric characteristics of the solar cell array 310 (the maximum power point tracking (MPPT)).

The method of controlling the magnitude of the DC voltage $V_{DC}$ output from the solar cell array 310 so that the amount of generated power of the solar cell array 310 tracks the maximum power may be performed according to various embodiments in the related art.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. A photovoltaic inverter comprising:
a DC link capacitor configured to store a DC voltage output from a solar cell array;
a power conversion stage configured to generate an AC power by using the DC voltage stored in the DC link capacitor to transmit the generated AC power to a power system; and
a controller configured to apply the DC voltage stored in the DC link capacitor to the power conversion stage,
wherein the controller applies a reverse voltage of an open-circuit voltage output from the solar cell array stored in the DC link capacitor to the solar cell array after interrupting the AC power transmitted to the power system depending on whether a driving value of the solar cell array satisfies a predetermined driving condition.

2. The inverter of claim 1, wherein the driving value of the solar cell array includes at least one of: a magnitude of the DC voltage output from the solar cell array, a driving time of the solar cell array, a driving time period of the solar cell array, and an intensity of polarization of the solar cell array.

3. The inverter of claim 1, further comprising:
a switch unit,
wherein the switch unit comprises a first switch connected between a positive terminal of the solar cell array and a positive terminal of the DC link capacitor, a second switch connected between a negative terminal of the solar cell array and a negative terminal of the DC link capacitor, a third switch connected between the positive terminal of the solar cell array and the negative terminal of the DC link capacitor, and a fourth switch connected between the negative terminal of the solar cell array and the positive terminal of the DC link capacitor.

4. The inverter of claim 3, wherein the controller turns on the first switch and the second switch and turns off the third switch and the fourth switch if the driving value of the solar cell array satisfies the predetermined driving condition, and wherein the controller turns off the first switch and the second switch and turns on the third switch and the fourth switch if the driving value of the solar cell array does not satisfy the predetermined driving condition.

5. The inverter of claim 1, wherein the DC link capacitor stores the open-circuit voltage output from the solar cell array if the driving value of the solar cell array does not satisfy the predetermined driving condition.

6. A photovoltaic inverter comprising:
a DC link capacitor configured to store a DC voltage output from the solar cell array;
a power conversion stage configured to generate an AC power by using the DC voltage stored in the DC link capacitor to transmit the generated AC power to a power system; and
a controller configured to apply the DC voltage stored in the DC link capacitor to the power conversion stage,
wherein the controller applies a reverse voltage of an open-circuit voltage output from the solar cell array stored in the DC link capacitor to the solar cell array after interrupting the AC power transmitted to the power system depending on whether a driving value of the solar cell array satisfies a predetermined driving condition,
wherein the controller applies the DC voltage stored in the DC link capacitor to the power conversion stage if the driving value of the solar cell array satisfies the predetermined driving condition, and wherein the controller applies the reverse voltage of the open-circuit voltage stored in the DC link capacitor to the solar cell array if the driving value of the solar cell array does not satisfy the predetermined driving condition.

7. The inverter of claim 6, further comprising:
a switch unit,
wherein the switch unit comprises a first switch connected between a positive terminal of the solar cell array and a positive terminal of the DC link capacitor, a second switch connected between a negative terminal of the solar cell array and a negative terminal of the DC link capacitor, a third switch connected between the positive terminal of the solar cell array and the negative terminal of the DC link capacitor, and a fourth switch connected between the negative terminal of the solar cell array and the positive terminal of the DC link capacitor.

8. The inverter of claim 7, wherein the controller turns on the first switch and the second switch and turns off the third switch and the fourth switch if the driving value of the solar cell array satisfies the predetermined driving condition, and wherein the controller turns off the first switch and the second switch and turns on the third switch and the fourth switch if the driving value of the solar cell array does not satisfy the predetermined driving condition.

9. The inverter of claim 6, wherein the DC link capacitor stores the open-circuit voltage output from the solar cell array if the driving value of the solar cell array does not satisfy the predetermined driving condition.

* * * * *